Nov. 7, 1950 E. E. CARPENTIER 2,528,484

PHASE-INVERTER AMPLIFIER

Filed Oct. 18, 1946

INVENTOR
EDMOND E. CARPENTIER
BY [signature]
AGENT

Patented Nov. 7, 1950

2,528,484

UNITED STATES PATENT OFFICE 2,528,484

PHASE-INVERTER AMPLIFIER

Edmond Egbertus Carpentier, Eindhoven, Netherlands, assignor to Hartford National Bank and Trust Company, Hartford, Conn., as trustee Application October 18, 1946, Serial No. 704,127
In the Netherlands July 11, 1945

Section 1, Public Law 690, August 8, 1946
Patent expires July 11, 1965

5 Claims. (Cl. 179—171)

For amplifying electric oscillations a circuit arrangement is known, comprising two amplifying tubes each of which includes an impedance Z in the anode circuit and in which the voltage to be amplified is supplied to one of the tubes (the directly controlled tube), whereas the control voltage for the other tube (the indirectly controlled tube) is derived from the anode impedance of the directly controlled tube. Now, the circuit arrangement is of such a design that the control voltages in the two control grid circuits are equal and in anti-phase and that the amplifier operates as a push-pull amplifier.

The frequency characteristic curve of the amplification of this arrangement, which is frequently denoted as a phase inverter amplifier, is determined substantially by the anode impedance so that, if the latter are dependent on frequency, the amplification becomes also dependent on frequency. If an amplification independent of frequency is desired, this may be obtained, provided that the region of frequencies is not too broad, by utilising resistances as anode impedances. For a very broad region of frequencies, however, the amplification becomes dependent on frequency again, since at high frequency the capacities of the tubes and of the arrangement, which are parallel to the anode resistances, become manifest. Besides, at high frequency the control voltages of the two tubes are no longer exactly in anti-phase and the push-pull action is then lost.

The present invention purports to design an amplifier of the above-described type in such manner that in spite of the dependence of the anode impedances Z on frequency the amplification in a broad region is independent of frequency and the push-pull action is retained.

According to the invention, this object is achieved in such manner that the conductor by which the junction of the anode impedances is connected to the cathodes of the amplifying tubes includes an impedance, which is also included in the control grid circuits of the two tubes and which has such a value that the voltage drop occurring at this impedance is approximately equal to half the voltage to be amplified, and that the voltage set up at the anode impedance of the directly controlled tube is supplied to the control grid circuit of the other tube (the directly controlled tube) across such a frequency-dependent network that the output voltage of the network is composed of two components which are proportional to the voltage set up at the impedance Z and to the current through this impedance respectively.

The invention will be explained more fully by reference to the accompanying drawing showing, by way of example, a few embodiments thereof.

Figure 1:
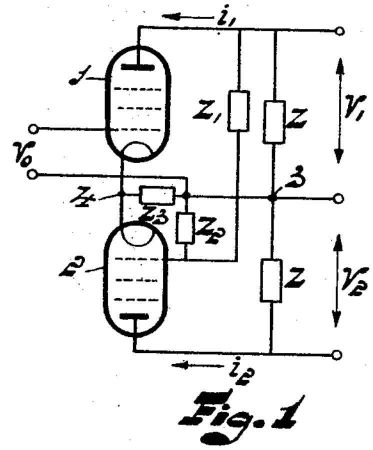

The circuit arrangement shown in Figure 1 comprises two identical amplifying tubes 1 and 2 comprising anode impedances Z. The voltage $V_0$ to be amplified is supplied to the control grid circuit of the directly controlled tube 1. The conductor between the junction 3 of the impedances Z and the junction 4 of the cathodes includes an impedance $Z_3$, which is also included in the control grid circuits of the two tubes. Furthermore, there is provided a network constituted by the impedances $Z_1$ and $Z_2$ by means of which a voltage derived from the voltage set up at the impedance Z in the anode circuit of the directly controlled tube 1 is supplied to the control grid circuit of the indirectly controlled tube 2. It is assumed that the impedance $Z_1+Z_2$ of the network has such a value as to be negligible with respect to impedance Z. Further, it is assumed that the internal resistance of the amplifying tubes is high with respect to the impedance Z.

Between the anode currents $i_1$ and $i_2$ and the control grid voltages $V_{g_1}$ and $V_{g_2}$ then exist the relations:

$$i_1=SV_{g_1} \text{ and } i_2=SV_{g_2} \quad (1)$$

in which S represents the mutual conductance of the tube. Furthermore $$V_{g_1}=V_0-(i_1+i_2)Z_3 \quad (2)$$
$$V_{g2}=-\beta i_1 Z-(i_1+i_2)Z_3$$

in which $$\beta=\frac{Z_2}{Z_1+Z_2}$$

represents the voltage transmission of the network.

From (1) and (2) ensue for the currents $i_1$ and $i_2$ $$i_1=\frac{S(1+SZ_3)}{(1+SZ_3)(2-S\beta Z)}V_0$$

$$i_2=-\frac{S^2(\beta Z+Z_3)}{(1+SZ_3)(2-S\beta Z)}V_0$$

According to the invention, $Z_3$ is given such an assumed value that in the whole of the frequency region to be amplified the conditions $$SZ_3 \gg 1 \qquad Z_3 \gg \beta Z \tag{3}$$

are fulfilled. Then $(1+SZ_3) \cong SZ_3$, and substituting $$i_1 = \frac{S}{2-S\beta Z}V_0 \tag{4}$$

$$i_2 = -\frac{S}{2-S\beta Z}V_0$$

from which ensues that the currents are of same value and in anti-phase, such as is required for push-pull amplification. It is remarked that the currents are independent of $Z_3$ so that, provided that the conditions (3) are fulfilled, this impedance may be composed in any arbitrary manner. It is evident, however, that the impedance must be capable of passing the anode direct current of the tubes.

For the voltage drop occurring at the impedance Z we find, if the conditions (3) are fulfilled:

$$-(i_1+i_2)Z_3 = -\tfrac{1}{2}V_0$$

The conditions (3) may therefore be interpreted so that the impedance $Z_3$ must have such a value that the voltage drop occurring at the latter becomes approximately equal to half the voltage $V_0$ to be amplified. For the voltages $V_1$ and $V_2$, which occur at the anode impedances Z, there applies:

$$V_1 = -V_2 = \frac{SZ}{2-S\beta Z}V_0 = \frac{1}{\dfrac{2}{SZ}-\beta}V_0$$

from which for the amplification $g$ follows:

$$g = \frac{V_1}{V_0} = -\frac{V_2}{V_0} = \frac{1}{\dfrac{2}{SZ}-\beta} \tag{5}$$

According to the invention, the network constituted by $Z_1$ and $Z_2$ is given such a value that $$\frac{2}{SZ}-\beta = A = \text{constant} \tag{6}$$

and the amplification $g$ is rendered independent of frequency.

By the condition (6) there is fixed a determined relation between the network $Z_1$, $Z_2$ and the anode impedance Z. If the latter is given, it is possible to derive from (6) the composition of the network.

Figure 2:
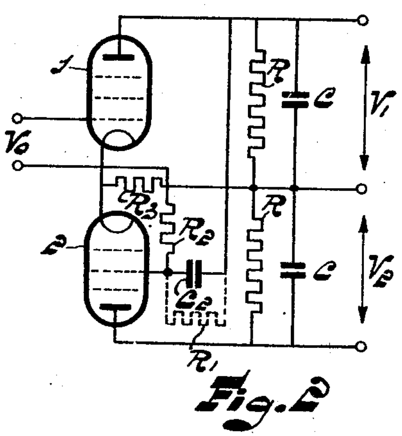

If, for example, in the manner illustrated in Figure 2 the anode impedance Z is constituted by a resistance R with which a condenser C is connected in parallel, the network may be constituted by the series connection of a condenser $C_2$ and a resistance $R_2$, provided that in the whole of the frequency region to be amplified the impedance of $C_2$ is high with respect to $R_2$ or, in other words, the voltage supplied by the network to the control grid circuit of tube 2 must in the whole of the frequency region be displaced in phase by about 90° with respect to the voltage $V_1$ and increase in direct proportion to frequency, since in this case $$\beta = \frac{R_2}{R_2+\dfrac{1}{J\omega C_2}} \cong J\omega C_2 R_2 \tag{7}$$

and since $$Z = \frac{1}{\dfrac{1}{R}+J\omega C} \tag{8}$$

It ensues from Equation 6, and substituting Equations 7 and 8

$$\frac{2}{SZ}-\beta = \frac{2}{SR}+J\omega\frac{C}{S}-J\omega C_2R_2$$

If, in order to fulfill condition (6), $C_2$ is assumed to be such a value that $$C_2 = \frac{C}{SR_2}$$

then $$A = \frac{2}{SZ}-\beta = \frac{2}{SR}$$

and the amplification $$g = \frac{2}{A} = SR$$

and is independent of frequency.

With $$C_2 = \frac{C}{SR_2}$$

ensues $$\beta = J\omega\frac{C}{S} \qquad \beta Z = \frac{J\omega CR}{S(1+J\omega CR)}$$

If, as in Figure 2, $Z_3$ is constituted by a resistance $R_3$, then the conditions (3) are:

$$R_3 \gg \frac{1}{S}$$

$$R_3 \gg \frac{\omega CR}{S\sqrt{1+\omega^2C^2R^2}}$$

For arbitrary values: $S=5.10^{-3}mA/v$, $C=50pF$, $R=10^5\Omega$, and with the assumption that the highest frequency to be amplified is $$f_h = \frac{\omega}{2\pi} = \frac{10^7}{2\pi}$$

condition (3) is fulfilled if $$R_3 \gg 200$$

Consequently, a resistance $R_3$ of 1000 ohms suffices. The amplification amounts to $g=SR=500$ and if $R_2=2000$ ohms, then $$C_2 = \frac{C}{SR_2} = 5pF$$

The amplification of the arrangement shown in Figure 2 may be raised by connecting a resistance $R_1$ in parallel with the condenser $C_2$, as shown in dotted lines in Figure 1. In this case the condenser $C_2$ must be given such a value that $$C = \frac{1}{S}\,\frac{R_1+R_2}{R_1R_2}C$$

in which event the amplification is given by $$g = \frac{SR}{2-\dfrac{SRR_2}{R_1+R_2}}$$

which is greater than in the case that $R_1$ is absent, when $$2 > \frac{SRR_2}{R_1+R_2} > 1$$

In this execution the output voltage of the network for low frequency is co-phase with the voltage $V_1$ and for high frequency displaced in phase by about 90° with respect to the said voltage.

The physical meaning of condition (6) becomes clear when multiplying the two sides by the output voltage $V_1$ $$\frac{2V_1}{SZ}-\beta V_1=AV_1$$

and since $$V_1=-i_1Z$$

$$\beta V_1=-\left(AV_1+\frac{i_1}{S}\right)$$

Now $V_1$ is the output voltage of the network $Z_1$, $Z_2$, which is supplied to the grid circuit of the indirectly controlled tube so that this output voltage must be composed of two components which are proportional to the voltage $V_1$ set up at the anode impedance Z and to the current through this anode impedance respectively.

Figure 3:
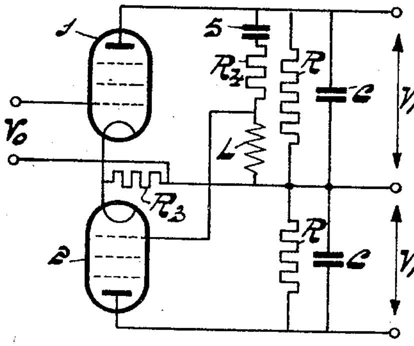
Figure 4:
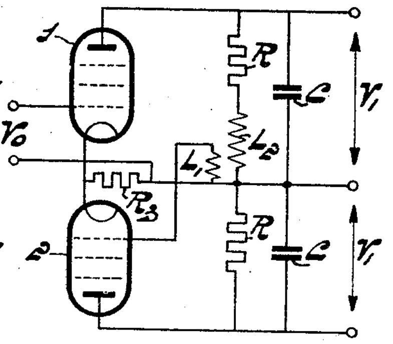

As mentioned already in the foregoing, $Z_3$ may have any arbitrary value, provided that conditions (3) are fulfilled. Consequently, in the arrangement shown in Figure 2 the resistance $R_3$ may be replaced by another impedance, for example a choke coil. Instead of the network $C_2$, $R_2$ or $C_2$, $R_1$, $R_2$ in Figure 2 use may also be made of other networks; for example of a resistance $R_4$ in series with an inductance L, as shown in Figure 3, in which event the voltage set up at the inductance is supplied to the control grid of the indirectly controlled tube 2. When the impedance of the inductance L in the whole of the region of frequencies is small with respect to the resistance $R_4$, the network $R_4$, L behaves as the network $C_1$, $R_2$ of Figure 2 and, as before, a voltage displaced in phase by 90° with respect to $V_1$ is supplied to the control grid of tube 2. The condenser 5 in Figure 3 serves to keep the anode direct voltage of tube 1 away from the control grid of tube 2 and is given such a value that its impedance is negligible with respect to resistance 4. At last, Figure 4 shows an arrangement in which the control voltage for tube 2, which is displaced in phase by 90° with respect to $V_1$, is derived from an inductance L coupled to an inductance $L_2$ in series with the anode resistance R of tube 1.

What I claim is:

1. An electronic amplifier circuit arrangement, comprising first and second electron discharge tubes having substantially equal mutual conductances and coupled together in phase-inverting, push-pull arrangement, each of said tubes having anode, control grid and cathode electrodes, means to apply an input signal voltage to the control grid of said first tube, means to apply to said control grids a bias potential substantially equal to one half the input signal voltage comprising a first impedance element having one end thereof coupled to said cathodes, second and third impedance elements having substantially equal values and interposed between the other end of said first impedance element and the anodes of said first and second tubes respectively, a fourth impedance element coupled between the anode of said first tube and the control grid of said second tube, and a fifth impedance element coupled between the control grid of said second tube and the other end of said first impedance element, said second, fourth and fifth impedance elements having impedance values such that:

$$\frac{2}{SZ}-\frac{Z_2}{Z_1+Z_2}=A$$

where S represents the mutual conductance of said first tube, Z represents the impedance value of said second impedance element, $Z_1$ represents the impedance value of said fourth impedance element, $Z_2$ represents the impedance value of said fifth impedance element and A represents a constant.

2. An electronic amplifier circuit arrangement, comprising first and second electron discharge tubes having substantially equal mutual conductances and coupled together in phase-inverting, push-pull arrangement, each of said tubes having anode, control grid and cathode electrodes, means to apply an input signal voltage to the control grid of said first tube, means to apply to said control grids a bias potential substantially equal to one half the input signal voltage comprising a first impedance element having one end thereof coupled to said cathodes, second and third impedance elements having substantially equal values and interposed between the other end of said first impedance element and the anodes of said first and second tubes respectively, said second and third impedance elements each comprising a resistive element and a capacitive element connected in parallel, a capacitor coupled between the anode of said first tube and the control grid of said second tube, and a resistor coupled between the control grid of said second tube and the other end of said first impedance element, said second impedance element, said capacitor and said resistor having values such that:

$$\frac{2}{SZ}-\frac{Z_2}{Z_1+Z_2}=A$$

where S represents the mutual conductance of said first tube, Z represents the impedance value of said second impedance element, $Z_1$ represents the impedance value of said capacitor, $Z_2$ represents the resistance value of said resistor and A represents a constant, is substantially satisfied.

3. An electronic amplifier circuit arrangement, comprising first and second electron discharge tubes having substantially equal mutual conductances and coupled together in phase-inverting, push-pull arrangement, each of said tubes having anode, control grid and cathode electrodes, means to apply an input signal voltage to the control grid of said first tube, means to apply to said control grids a bias potential substantially equal to one half the input signal voltage comprising a first impedance element having one end thereof coupled to said cathodes, second and third impedance elements having substantially equal values and interposed between the other end of said first impedance element and the anodes of said first and second tubes respectively, said second and third impedance elements each comprising a resistance element and a capacitive element connected in parallel, a fourth impedance element coupled between the anode of said first tube and the control grid of said second tube, said fourth impedance element comprising a first resistor and a capacitor connected in parallel, and a second resistor coupled between the control grid of said second tube and the other end of said first impedance element, said second and fourth impedance elements and said second resistor having values such that:

$$\frac{2}{SZ}-\frac{Z_2}{Z_1+Z_2}=A$$

where S represents the mutual conductace of said first tube, Z represents the impedance value of said second impedance element, $Z_1$ represents the impedance value of said fourth impedance element, $Z_2$ represents the resistance value of said second resistor and A represents a constant, is substantially satisfied.

4. An electronic amplifier circuit arrangement, comprising first and second electron discharge tubes having substantially equal mutual conductances and coupled together in phase-inverting, push-pull arrangement, each of said tubes having anode, control grid and cathode electrodes, means to apply an input signal voltage to the control grid of said first tube, means to apply to said control grids a bias potential substantially equal to one half the input signal voltage comprising a first impedance element having one end thereof coupled to said cathodes, second and third impedance elements having substantially equal values and interposed between the other end of said first impedance element and the anodes of said first and second tubes respectively, said second and third impedance elements each comprising a resistive element and a capacitive element connected in parallel, a resistor coupled between the anode of said first tube and the control grid of said second tube, and an inductor coupled between the grid of said second tube and the other end of said first impedance element, said second impedance element, said resistor and said inductor having values such that:

$$\frac{2}{SZ}-\frac{Z_2}{Z_1+Z_2}=A$$

where S represents the mutual conductance of said first tube, Z represents the impedance value of said second impedance element, $Z_1$ represents the resistance value of said resistor, $Z_2$ represents the impedance value of said inductor and A represents a constant, is substantially satisfied.

5. An electronic amplifier circuit arrangement, comprising first and second electron discharge tubes having substantially equal mutual conductances and coupled together in phase-inverting, push-pull arrangement, each of said tubes having anode, control grid and cathode electrodes, means to apply an input signal voltage to the control grid of said first tube, means to apply to said control grids a bias potential substantially equal to one half the input signal voltage comprising a first impedance element having one end thereof coupled to said cathodes, second and third impedance elements having substantially equal values and interposed between the other end of said first impedance element and the anodes of said first and second tubes respectively, a first inductive element, and a second inductive element inductively coupled to said first inductive element, said first and second inductive elements intercoupling the anode of said first tube and the control grid of said second tube, said second inductive element being coupled between the control grid of said second tube and the other end of said first impedance element, and said second impedance element and said first and second inductive elements having impedance values such that:

$$\frac{2}{SZ}-\frac{Z_2}{Z_1+Z_2}=A$$

where S represents the mutual conductance of said first tube, Z represents the impedance value of said second impedance element, $Z_1$ represents the impedance value of said inductively coupled inductive elements, $Z_2$ represents the impedance value of said second inductive element and A represents a constant, is substantially satisfied.

EDMOND EGBERTUS CARPENTIER.

REFERENCES CITED

The following references are of record in the file of this patent:

UNITED STATES PATENTS

| Number | Name | Date |
|---|---|---|
| 2,221,102 | Moyer | Nov. 12, 1940 |
| 2,322,528 | Lewis | June 22, 1943 |

FOREIGN PATENTS

| Number | Country | Date |
|---|---|---|
| 504,960 | Great Britain | May 3, 1939 |